(12) United States Patent
Luetzelberger

(10) Patent No.: US 9,594,991 B2
(45) Date of Patent: Mar. 14, 2017

(54) METHOD, READER AND SYSTEM FOR FINDING OBJECTS

(75) Inventor: Dirk Luetzelberger, Hamburg (DE)

(73) Assignee: NXP B.V., Eindhoven (NL)

(*) Notice: Subject to any disclaimer, the term of this patent is extended or adjusted under 35 U.S.C. 154(b) by 692 days.

(21) Appl. No.: 12/843,661

(22) Filed: Jul. 26, 2010

(65) Prior Publication Data

US 2011/0018712 A1 Jan. 27, 2011

Related U.S. Application Data

(63) Continuation of application No. 11/630,846, filed as application No. PCT/IB2005/052015 on Jun. 20, 2005, now abandoned.

(30) Foreign Application Priority Data

Jun. 24, 2004 (EP) .................................. 04102946

(51) Int. Cl.
*G06K 7/10* (2006.01)
*G06K 17/00* (2006.01)

(52) U.S. Cl.
CPC ......... *G06K 17/00* (2013.01); *G06K 7/10079* (2013.01); *G06K 2017/0051* (2013.01); *G06K 2017/0074* (2013.01)

(58) Field of Classification Search
CPC ....... G06K 7/10079; G06K 2017/0051; G06K 2017/0074; G06Q 10/087
USPC ...... 235/375, 385, 383; 705/26.61–26.9, 28; 340/572.1, 10.1, 10.4–10.42, 8.1, 539.1, 340/539.32
See application file for complete search history.

(56) References Cited

U.S. PATENT DOCUMENTS

| | | | |
|---|---|---|---|
| 5,404,507 A * | 4/1995 | Bohm et al. | |
| 6,232,877 B1 | 5/2001 | Ashwin | |
| 6,275,142 B1 * | 8/2001 | Paleiov et al. | 340/10.1 |
| 6,354,493 B1 * | 3/2002 | Mon | 235/380 |
| 6,401,084 B1 * | 6/2002 | Ortega et al. | 707/706 |
| 6,446,064 B1 | 9/2002 | Livowsky | |
| 6,487,553 B1 * | 11/2002 | Emens et al. | |
| 6,624,752 B2 | 9/2003 | Klitsgaard et al. | |

(Continued)

FOREIGN PATENT DOCUMENTS

| | | |
|---|---|---|
| CN | 1299493 A | 6/2001 |
| EP | 1396810 A1 | 3/2004 |

(Continued)

OTHER PUBLICATIONS

International Search Report and Written Report, PCT/IB2005/052015, Mar. 6, 2006.

(Continued)

*Primary Examiner* — Suezu Ellis

(57) ABSTRACT

In an object finding method for finding an object (20) provided with a contactless readable data carrier (2), descriptive data (INF) stored in the data carrier (2) are transmitted to a reading device (1) when the data carrier (2) comes into the effective area of the reading device (1). In the reading device (1) the descriptive data (INF) received from the data carrier (2) are compared with predefined profile data (PRO) in respect of the fulfillment of at least one comparison condition. Upon fulfillment of the comparison condition the reading device (1) subsequently issues a notification (TRIG).

13 Claims, 1 Drawing Sheet

(56) References Cited

U.S. PATENT DOCUMENTS

| | | | |
|---|---|---|---|
| 7,044,373 B1* | 5/2006 | Garber et al. | 235/385 |
| 7,142,120 B2* | 11/2006 | Charych | G01S 3/20 |
| | | | 340/10.1 |
| 7,588,185 B2* | 9/2009 | Berquist et al. | 235/385 |
| 2002/0145534 A1 | 10/2002 | Dempsey | |
| 2004/0036595 A1 | 2/2004 | Kenny et al. | |
| 2004/0041696 A1* | 3/2004 | Hull et al. | 340/10.42 |
| 2004/0267545 A1 | 12/2004 | Buchmann et al. | |
| 2006/0017544 A1* | 1/2006 | Tanaka et al. | 340/10.2 |
| 2009/0179738 A1* | 7/2009 | Kageyama | G06K 7/0008 |
| | | | 340/10.1 |

FOREIGN PATENT DOCUMENTS

| | | |
|---|---|---|
| JP | 2001-101189 A | 4/2001 |
| JP | 2002-271229 A | 9/2002 |
| WO | 03100740 A1 | 12/2003 |

OTHER PUBLICATIONS

Reade, W. et al. "RFID Systems for Enhanced Shopping Experiences", 14 pgs, retrieved from the internet at: http://www.jefflindsay.com/rfid4.shtml (Apr. 27, 2004).

Lindsay, J. et al. "RFID Locating Systems for Linking Valued Objects with Multimedia Files", 14 pgs, retrieved from the internet at: http://www.jefflindsay.com/rfid2.shtml (Apr. 27, 2004).

Andreoli, J.-M. et al. "Augmenting Offices with Ubiquitous Sensing", Xeror Research Centre Europe, 4 pgs, retrieved from the internet at: www.xrce.xerox.com/layout/set/print/content/.../file/augmentOfficeSOC.pdf (Apr. 27, 2004).

\* cited by examiner

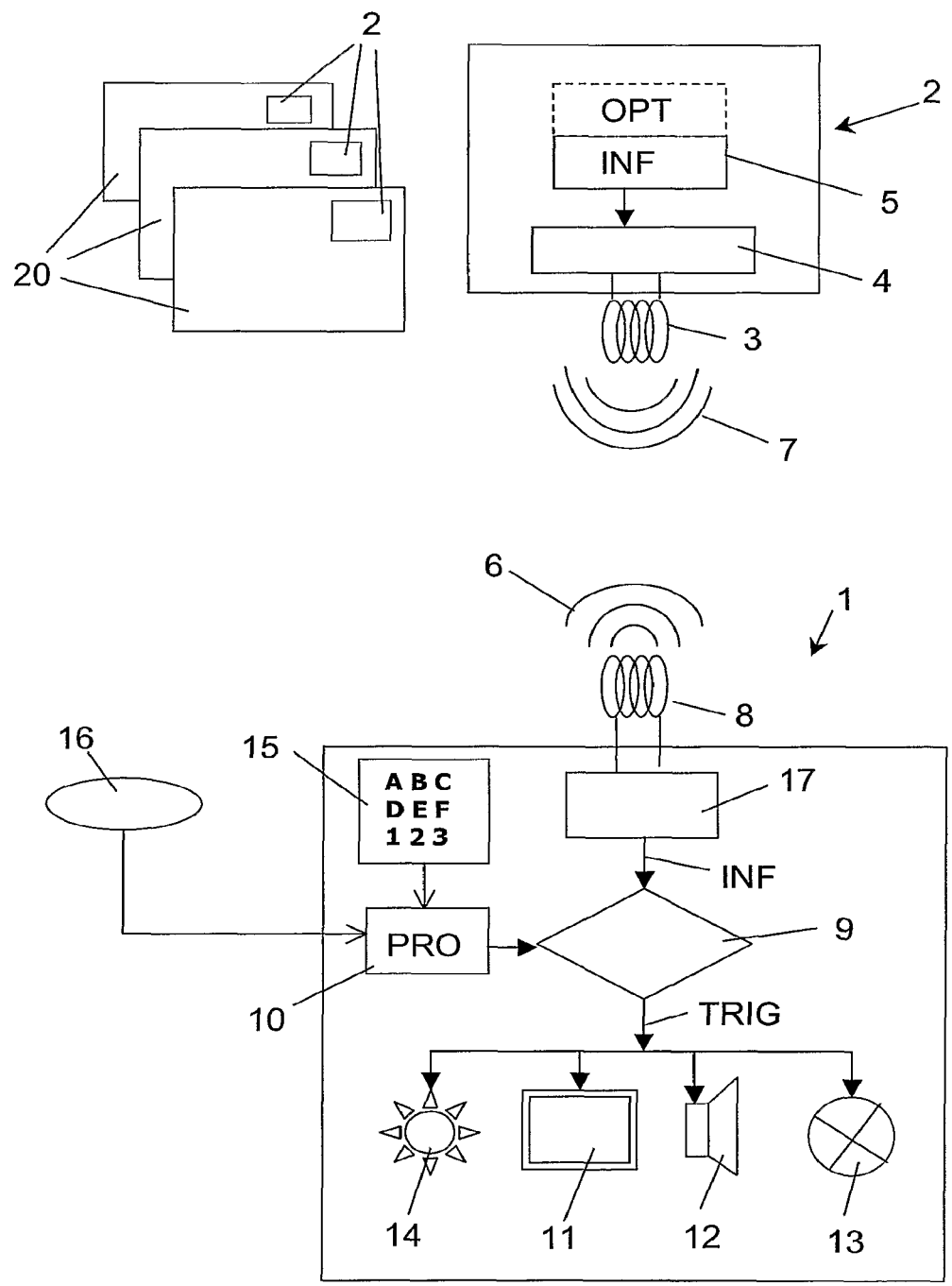

METHOD, READER AND SYSTEM FOR FINDING OBJECTS

FIELD OF THE INVENTION

The invention relates to an object finding method for finding an object provided with a contactless readable data carrier, wherein descriptive data stored in the data carrier are sent to a reading device when the data carrier comes into the effective area of the reading device.

The invention further relates to a mobile reading device for finding an object provided with a contactless readable data carrier, wherein descriptive data that are stored in the data carrier are sent to the reading device when the data carrier comes into the effective area of the reading device.

The invention further relates to an object finding system with a mobile reading device as mentioned in the previous paragraph and a multiplicity of contactless readable data carriers that can be attached to objects.

BACKGROUND OF THE INVENTION

Such an object finding method, such a reading device and such an object finding system are known from U.S. Pat. No. 6,624,752 B2. This document especially reveals a system and a method for detecting and identifying an object, in which data carriers can be attached to for example pieces of luggage, where the data carriers are configured for wireless transmission of an identifiable signal in the high frequency range. The system further comprises a reading device for detecting and identifying the signal. Mobile telephones or PDAs are preferably used as reading devices. The data transmission for identification of the object takes place by using Bluetooth® or DECT technology.

The disadvantage noticed in the known object finding method, the known reading device and the known object finding system is that, at the moment of the desired detection of the object by the reading device, the identification signal needs to be completely known so that detection is possible. In other words, the exact identity information of the object to be detected must already be available before the detection process in the reading device. This naturally restricts the functionality of the system to pre-known, unambiguously identifiable objects, such as finding a piece of luggage in the personal ownership of the user of the system. The known system thus lacks of flexibility.

OBJECT AND SUMMARY OF THE INVENTION

It is an object of the invention to create an object finding method of the type indicated in the first paragraph, a mobile reading device of the type indicated in the second paragraph and an object finding system of the type indicated in the third paragraph, in which the disadvantages mentioned earlier are avoided.

To achieve the above-mentioned object, features as invented are provided in the object finding method as invented, such that a method as invented can be characterized in the manner defined below, namely:

Object finding method for finding an object provided with a contactless readable data carrier, wherein descriptive data stored in the data carrier are transmitted to a reading device when the data carrier comes into the effective area of the reading device, wherein the descriptive data received from the data carrier are compared with predefined profile data in respect of the fulfillment of at least one comparison condition, and wherein the reading device issues a notification upon fulfillment of the comparison condition.

To achieve the above-mentioned object, features as invented are provided on a reading device as invented, so that a mobile reading device as invented can be characterized in the manner defined below, namely:

Mobile reading device for finding an object provided with a contactless readable data carrier, wherein descriptive data stored in the data carrier are transmitted to the reading device when the data carrier comes into the effective area of the reading device, wherein the reading device is designed for the purpose of comparing the descriptive data received from the data carrier with predefined profile data in respect of the fulfillment of at least one comparison condition, and wherein the reading device is designed for issuing a notification upon fulfillment of the comparison condition.

To achieve the above-mentioned object, a mobile reading device as invented and a multiplicity of contactless readable data carriers that can be attached to objects are provided for an object finding system as invented, wherein descriptive data describing the objects and, optionally, additional data can be stored in the data carriers, wherein the data carriers are designed for the purpose of transmitting the descriptive data and optionally additional data to the reading device when they come into the effective area of the reading device, wherein the reading device is designed for the purpose of comparing the descriptive data received from the data carriers with predefined profile data in respect of the fulfillment of at least one comparison condition, and wherein the reading device is designed for issuing a notification in case of fulfillment.

The features as invented achieve that objects can be located even if the user knows only fragments of information about the object. Appropriate definition and possible refinement of the comparison condition help to enable the user to successfully achieve the desired search using his fragmental information. It is possible to define search profiles by means of the invention. The reading device is advantageously, but not exclusively, configured as a mobile telephone or Personal Digital Assistant (PDA), into which the functions as invented have been integrated, besides its original functions.

It is advantageous if the notification is a visual, audible or tactile signal, because in this way, the notification of the user of the reading device is easily noticeable and if for example the reading device is designed as a mobile telephone or PDA, the required components are already integrated into the devices.

It is further advantageous if the notification comprises showing at least a part of the descriptive data on a display. The notification can be given in plain text, which greatly simplifies the handling of the system for the user.

An advantageous variant of the invention is also provided by a method, wherein additional data are transmitted by the data carrier to the reading device, and wherein preferably at least a part of the additional data are shown on a display of the reading device. In this manner, it is possible to show additional information that was not part of the search profile, but is of interest to the user. The additional information can contain, for example, further explanation about the object or the manufacturer or its origin etc.

It is further advantageous if the reading device, on receiving descriptive data fulfilling the comparison condition from a number of data carriers, displays a hit list of these objects, wherein an object can preferably be selected from the hit list and wherein the object finding method is executed once more for the selected object. The search profile can thus be defined so generally that even a plurality of objects fulfill the comparison conditions. All objects that fulfill the comparison conditions are displayed in a hit list, from which hit list a user can make a selection of an object, which is the equivalent of a refinement of the comparison conditions, which will deliver a clear result. On selecting an object according to the invention, a search is again made for exactly this object.

Another advantageous variant of the invention is provided by a method, wherein the comparing of the descriptive data with the profile data is done on the basis of character sequence without taking any data structures into consideration. This is because it does not require any standardization of data structures of descriptive data for the search for objects, but the comparison between descriptive data and profile data takes place on the basis of character sequences, so-called plain text without formatting. The comparison conditions can then be defined in such a manner that no complete match is needed between all of the profile data and descriptive data or respective parts thereof, but the similarity of character sequences (or parts thereof) is considered to be adequate. The use of character sequences simplifies the implementation of the system as invented, because no consensus need be achieved between various manufacturers about the data structures, but the invention is implemented independently of the manufacturer. Naturally, this does not preclude the descriptive or profile data from being built up in a structured manner, but the structures are ignored during the comparison. The user does not, therefore, need to know a possibly existing data structure.

Furthermore, it is advantageous if the comparing of the descriptive data with the profile data is done on the basis of character sequences contained in selectable data structure elements. In the event that standards for data structures develop in the profile data, or that self-defined data structures are to be accessed in the profile data, the search can be restricted to certain data structure elements and thereby refined.

Moreover, it is advantageous if the effective area of the reading device is adjustable, because in this manner the range of the system as invented can be restricted. For example, if a plurality of small, neighboring objects (e.g. in a rummaging box) are detected when the object finding method as invented is executed, and a hit list is generated, it is expedient if the range of the reading device is reduced to the selection of an object, in order for the user to be led closer to the exact position of the object. It should be mentioned that according to the invention it is now preferred to configure the reading device and the data carrier as a Near Field Communication (NFC) Device, MIFARE® Device or Felica® Device, whose range for wireless transmission of data is limited to a few centimeters. The invention is not restricted to these technologies, however, but is generally applicable.

Another advantageous variant of the invention is available if the effective area of the reading device has a main effective direction. The application of the invention becomes very easy for the user, because of the directional data transmission he not only knows, that an object being searched for is in his vicinity, but even obtains information about the direction in which the searched-for object is located with respect to him or his reading device. It should be mentioned that the NFC and MIFARE® Devices mentioned in the previous paragraph have sufficiently directional effect to be particularly suitable for the purposes of the invention. One can also consider using infrared (IRDA) interfaces and Bluetooth or WLAN communication interfaces, but it should be remembered that the currently used infrared interfaces require a line-of-sight connection and are heavily directional, whereas the currently used Bluetooth or WLAN communication interfaces have no directionality. Besides, Bluetooth and WLAN need active communication partners that need power supply through batteries or the mains.

Finally, it is also advantageous if the profile data can be loaded into the reading device from an external source, because so they become easily accessible to the user. Such profile data can be offered, for example by object manufacturers, for downloading on display shelves, at shop entrances or over a computer network, such as the Internet.

These and other aspects of the invention are apparent from and will be elucidated, by way of non-limitative example, with reference to the embodiment described hereinafter.

BRIEF DESCRIPTION OF THE DRAWINGS

The invention will be elucidated below with reference to the example of embodiment illustrated in the single non-limitative FIG. 1.

DESCRIPTION OF EMBODIMENTS

FIG. 1 shows a block circuit diagram of an exemplary embodiment of an object finding system as invented. The object finding system as invented comprises a mobile reading device 1 and a multiplicity of contactless readable data carriers 2 mounted on objects 20. The mobile reading device 1 is configured preferably as a mobile telephone or Personal Digital Assistant (PDA). For the purposes of the invention, the number of reading devices 1 existing in the object finding system is inconsequential. The data carriers 2 are configured as what are called Radio Frequency Identification (RFID) Tags. Only for the sake of explanation, let it be assumed that these objects 20 are CDs, which are placed on a shelf or in a rummaging box and that the data carriers 2 are attached to the CD sleeves. A combination of the data carrier 2 with a paper price tag or with an RFID price tag is functional, but not absolutely essential. Due to the contactless configuration of the data carrier 2, it is not important whether they are arranged on the outside or inside of the cover. The data carriers 2 configured as RFID-Tags comprise a coupling element in the form of an antenna 3 for receiving electromagnetic signals 6, which are broadcast by the reading device 1 and used for transmitting electromagnetic signals 7 to the reading device 1, furthermore a communication interface 4 connected to the antenna 3 as well as a data storage 5. The data carrier 2 can also be supplied with electrical energy with the help of the electromagnetic signals 6 received by the reading device 1, for example if the data carrier 2 is a passive data carrier conforming to standard ISO/IEC-14443. In this case, the reading device 1 transmits an HF carrier signal of a frequency 13.56 MHz, which carries the pulse width modulated information. The range of this embodiment is typically up to 1 m. For reasons mentioned below, it is, however, preferable for the reading device 1 and the data carriers 2 to be configured as NFC-Devices (=Near Field Communication Device), for example conforming to standard ISO 18092, or to the MIFARE® standard. In NFC devices the range is typically about 20 cm; in devices conforming to the MIFARE® standard it is typically about 2 cm. In a simple configuration, the data carrier 2 adopts an active state on receiving sufficient electrical energy through the electromagnetic signal 6, the communication interface 4 sends the data stored in the memory 5, viz. descriptive data INF that identify the assigned object 20 and optionally additional data OPT that further explain the object 20 or contain background information such as manufacturer, interpreters, classification etc. in a modulated manner as electromagnetic signals 7 to the reading device 1. The transmission can take place either continuously or once upon request, when an anti-collision protocol is advantageously run if there are several tags in the reading range of a reading device 1. In a more powerful version of the data carrier 2 the communication interface 4 is configured as a state machine or a microprocessor for running communication protocols. Such a communication protocol can for example specify that the data carrier 2 transmits information only if it is demanded by broadcast command or inventory command from the reading device 1. Similarly, the communication protocol can provide that the reading device 1 demands the descriptive data INF and the additional data OPT separately from each other from data carrier 2. The data carrier 2 can be available in the most varied designs, for example as a chip; but it can also be embedded in very small forms in objects such as articles of clothing or packaging.

As mentioned, each data carrier 2 transmits the descriptive data INF of the object 20 assigned to it and optionally the additional data OPT to the reading device 1, if it reaches its effective area (either automatically or, as regularly provided, on request from the reading device 1). The mobile reading device 1 receives electromagnetic signals 7 transmitted from the data carrier 2 over an antenna 8. The antenna 8 is linked to a communication interface 17, which demodulates the descriptive data INF and optionally the additional data OPT from the received electromagnetic signals 7 and feeds the descriptive data INF to data comparing means 9. The data comparing means 9 compare the descriptive data INF according to at least one comparison condition with profile data PRO stored in a memory 10. If the comparison condition is fulfilled, then the data comparing means 9 outputs an indication TRIG to a user. The indication TRIG can be a visual, acoustic or tactile signal by configuring the indication TRIG as a signal that drives a lamp or light emitting diode 13, or a loudspeaker 12, or a vibration mechanism 14. In an advantageous design of the invention, the reading device 1 comprises a display 11. In this case the notification TRIG being displayed on the display 11 comprises at least a part of the descriptive data INF. When additional data OPT are sent by a data carrier 2 to the reading device 1, it is also proposed to display at least a part of the additional data OPT on the display 11, to inform a user of the reading device 1 comprehensively.

The profile data PRO represent a search concept, on the basis of which an object 20 can be identified. For example, a user of the reading device 1 would like to search for a CD by Wolfgang Amadeus Mozart in his rummaging box. The user creates a search profile by entering the term "Mozart" as profile data PRO through a user interface 15 and brings the reading device 1 near enough to the rummaging box so that the data carrier 2 immediately next to the objects 20 in the rummaging box come into the effective area of the reading device 1 and thus its descriptive data INF can be read out. The reading device 1 compares the profile data PRO, i.e. this term "Mozart" with the descriptive data INF received from the data carriers 2. Depending on the comparison conditions, the indication TRIG is outputted by the comparing means 9 if there is a match between the term "Mozart" and the descriptive data INF or a part thereof or (optionally) if the descriptive data INF are considered adequately similar to "Mozart". The invention differs from the state of the art in which it was necessary to know an exact identification signal or the like already at the beginning of the search so as to be able to carry out the search at all. In the present invention, the degree of accuracy of the search profile can vary.

If the user would first just like to know which CDs with classical music he has in his rummaging box, he can enter for example the term "Classic" as profile data PRO through the user interface 15. If the rummaging box contains several CDs whose descriptive data INF match the profile data PRO, the reading device outputs a hit list with all these CDs. The user can select an entry from this hit list, upon which the search is again carried out automatically including the already known descriptive data INF of these selected CDs as profile data PRO.

From the described example, it can be seen that under certain circumstances it may be difficult to find a certain object 20, if a number of objects 20 matching the profile data PRO, are placed spatially close together. For this reason it is desirable for the effective area of the reading device 1 to be relatively small. It is, therefore, preferred to configure the reading device 1 and the data carrier 2 as Near Field Communication (NFC) Devices or MIFARE® Devices, whose ranges for wireless transmission of data are restricted to a few centimeters. Alternatively, or complementarily, it can be arranged to be able to adjust the effective area of the reading device 1 or to adjust i.e. reduce it automatically to refine the search. Thus, for example, if a user selects an entry from a hit list, the effective area of the reading device 1 could be reduced automatically to facilitate the exact search for this selected object 20. For the same reason, it is desirable if the effective area of the reading device 1 has a main effective direction. This requirement is adequately fulfilled by Near Field Communication (NFC) Devices or MIFARE® Devices. Handling of the reading device 1 for finding objects 20 is very easy for the user because of the directional data transmission he not only knows, that the object 20 being searched for is in his vicinity, but even obtains information in which direction the searched-for object 20 is located with respect to him or his reading device. In this context, one could however also consider infrared (IRDA)-interfaces and Bluetooth or WLAN communication interfaces, which however posses either a very strong or no directionality and/or need an active communication partner.

A main feature of the invention is that the comparing of the descriptive data INF with the profile data PRO is done on the basis of character sequences, which are called plain text, without formatting. This measure provides freedom from having to undertake a standardization of the data structures of the descriptive data INF, which simplifies the implementation of the system as invented, because no consensus needs to be achieved between various manufacturers about the data structures, but on the contrary the invention can be implemented manufacturer-independently. The comparison conditions can be defined in this case in such a manner that no complete match is needed between the total profile data PRO and descriptive data INF or respective parts thereof, but the similarity of character sequences (or parts thereof) is considered adequate. The use of character sequences naturally does not preclude the descriptive or profile data INF or PRO from being built up in a structured manner; such data structures are, however, ignored on comparison. The user therefore does not need to know a possibly existing data structure. For the case where standards for data structures evolve in the profile data PRO, or where self-defined data structures in the profile data PRO are to be accessed, the comparing of the descriptive data INF with the profile data PRO can be done on the basis of character sequences contained in selectable data structure elements, which restricts the search for certain data structure elements and is thereby refined. These measures make it possible, for example, to search for the name "Mozart" only in a data structure element called "Composer" of the descriptive data INF.

In an advantageous embodiment of the invention it is proposed that the profile data PRO can be loaded into the reading device 1 from an external source 16. This can be done for example through a data connection to the Internet, or by scanning barcodes etc. For the user of the reading device 1 this makes for an extremely simple handling for creating the profile data PRO, because this excludes operating errors such as may occur when entering data through the user interface 15. Such profile data PRO loadable into the reading device 1 can be offered, for example by object manufacturers, for downloading on shelves, at shop entrances or over a computer network, such as the Internet.

The possibilities of application of the invention are multifarious. Besides the searching of objects 20 in a rummaging box, on shelves or the like, described as an example of embodiment, the invention can be used in libraries for finding books, in shops or lending institutions to find products with certain characteristics (e.g. pork-free sausages). It should be mentioned that the comparing conditions to be defined not only make it possible to search for matches or similarities, but it is also possible to define exclusion criteria (pork-free) i.e. elements which must not be contained. Predefined profile data PRO, downloaded, scanned or entered through the user interface, can be used for example to find a type of wine, recommended in a gourmet magazine, on a shelf of a delicatessen, without having to read the individual labels of the wine bottles placed there.

It finally should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. Object finding method for finding an object provided with a contactless readable data carrier, wherein descriptive data stored in the data carrier are sent to a reading device when the data carrier is in the effective area of the reading device, wherein the descriptive data received from the data carrier are compared with predefined profile data in respect of the fulfillment of at least one comparison condition, and wherein the reading device issues a notification upon fulfillment of said comparison condition, wherein the reading device upon reception of descriptive data fulfilling the comparison condition from a number of data carriers displays a hit list of these objects and wherein an object can be selected from the hit list to which a search can be restricted using the reading device to find the selected object from the objects in the hit list, wherein the search comprises automatically reducing the effective area of the reading device to facilitate a restricted search for the selected object.

2. Object finding method as claimed in claim 1, wherein the notification comprises showing at least a part of the descriptive data on a display.

3. Object finding method as claimed in claim 1, wherein at least a part of additional data that are transmitted by the data carrier to the reading device are shown on a display of the reading device.

4. Object finding method as claimed in claim 1, wherein the comparing of the descriptive data with the profile data is done on the basis of character sequences without taking any data structures into consideration.

5. Object finding method as claimed in claim 1, wherein the comparing of the descriptive data with the profile data is done on the basis of character sequences contained in selectable data structure elements.

6. Object finding method as claimed in claim 1, wherein the effective area of the reading device has a main effective direction.

7. Mobile reading device for finding an object provided with a contactless readable data carrier, wherein the reading device is designed for reading out descriptive data that are stored in the data carrier when the data carrier is in the effective area of the reading device, wherein the reading device is designed for the purpose of comparing the descriptive data received from the data carrier with predefined profile data in respect of the fulfillment of at least one comparison condition, and wherein the reading device is designed for issuing a notification upon fulfillment of the comparison condition, wherein the reading device is configured to display, upon reception of the descriptive data, fulfilling the comparison condition from a multiplicity of data carriers, a hit list of these objects in which an object can be selected from the hit list through a user interface to which a search can be restricted using the reading device to find the selected object from the objects in the hit list, wherein the search comprises automatically reducing the effective area of the reading device to facilitate a restricted search for the selected object.

8. Reading device as claimed in claim 7, wherein the reading device has a display and is configured to show as a notification at least a part of the descriptive data on the display.

9. Reading device as claimed in claim 7, wherein the reading device has a display and is configured to display at least a part of additional data that are transmitted by the data carrier to the reading device.

10. Reading device as claimed in claim 7, wherein the reading device is configured to carry out a comparison of the descriptive data with the profile data on the basis of character sequences without taking any data structures into consideration.

11. Reading device as claimed in claim 7, wherein the reading device is configured to carry out a comparison of the descriptive data with the profile data on the basis of character sequences contained in selectable data structure elements.

12. Reading device as claimed in claim 7, wherein the effective area of the reading device has a main effective direction.

13. Object finding system, with a mobile reading device and a multiplicity of contactless readable data carriers that can be attached to objects, wherein descriptive data describing the objects and, optionally, additional data can be stored in the data carriers, wherein the data carriers are designed for the purpose of transmitting the descriptive data and, optionally, additional data to the reading device when the data carriers is in the effective area of the reading device, wherein the reading device is designed for the purpose of comparing the descriptive data received from the data carriers with predefined profile data in respect of the fulfillment of at least one comparison condition, and wherein the reading device is designed for issuing a signal upon fulfillment of the comparison condition, wherein the reading device is configured to display, upon reception of the descriptive data, fulfilling the comparison condition from a multiplicity of data carriers, a hit list of these objects in which an object can be selected from the hit list through a user interface to which a search can be restricted using the reading device to find the selected object from the objects in the hit list, wherein the search comprises automatically reducing the effective area of the reading device to facilitate a restricted search for the selected object.

* * * * *